US009853296B2

(12) United States Patent
Hirsch et al.

(10) Patent No.: US 9,853,296 B2
(45) Date of Patent: Dec. 26, 2017

(54) HEAT EXCHANGER FOR A BATTERY UNIT

(71) Applicant: Behr GmbH & Co. KG, Stuttgart (DE)

(72) Inventors: Stefan Hirsch, Stuttgart (DE); Joachim Treier, Oppenau (DE); Lars Ludwig, Altbach (DE); Thomas Kuznia, Esslingen (DE)

(73) Assignee: MAHLE INTERNATIONAL GMBH, Stuttgart (DE)

( * ) Notice: Subject to any disclaimer, the term of this patent is extended or adjusted under 35 U.S.C. 154(b) by 153 days.

(21) Appl. No.: 13/968,768

(22) Filed: Aug. 16, 2013

(65) Prior Publication Data
US 2014/0048230 A1    Feb. 20, 2014

(30) Foreign Application Priority Data
Aug. 20, 2012  (DE) .................. 10 2012 214 783

(51) Int. Cl.
F28F 7/00        (2006.01)
H01M 6/50       (2006.01)
H01M 10/6556   (2014.01)
H01M 10/613    (2014.01)

(52) U.S. Cl.
CPC ....... *H01M 6/5038* (2013.01); *H01M 10/613* (2015.04); *H01M 10/6556* (2015.04)

(58) Field of Classification Search
CPC .... H01M 10/50; H01M 6/00; H01M 10/5004; H01M 10/5016; H01M 2/30; H01M 2/204; H01M 2/20; H01M 2/22; H01M 2/32; H01M 2/34; H01M 2/342; H01M 2/348; F28F 9/00; F28F 9/02; F28D 1/02; B23P 15/26

USPC ............. 165/80.1, 80.2, 67; 429/120, 121
See application file for complete search history.

(56) References Cited

U.S. PATENT DOCUMENTS 3,745,048 A * 7/1973 Dinkier ............. H01M 10/6563
                                                        429/120
4,059,778 A * 11/1977 Sohnle ......................... 310/68 D
4,189,653 A *  2/1980 Hiratuka et al. ............. 310/68 D
(Continued)

FOREIGN PATENT DOCUMENTS

DE          26 31 132 A1    2/1977
DE     102008059952 A1 *   6/2010  .......... H01M 10/625
(Continued)

OTHER PUBLICATIONS

Machine Translation for DE102008059952.*
(Continued)

*Primary Examiner* — Len Tran
*Assistant Examiner* — Gustavo Hincapie Serna
(74) *Attorney, Agent, or Firm* — Paul D. Strain, Esq.; Strain & Strain PLLC

(57) ABSTRACT

The invention relates to a heat exchanger for a battery unit, comprising coolant-conducting tubes which end at both sides in in each case one collector, wherein each collector is connected to at least one tube and a potential equalization element for electrical potential equalization connects at least one collector to a housing of the battery. To produce potential equalization between the heat exchanger and a battery housing in as inexpensive a manner as possible, the potential equalization element and the collector are formed in one piece.

15 Claims, 4 Drawing Sheets

(56) References Cited

U.S. PATENT DOCUMENTS

| | | | | |
|---|---|---|---|---|
| 5,445,219 | A * | 8/1995 | Hutto | F28D 1/05375 165/153 |
| 5,585,204 | A * | 12/1996 | Oshida | H01M 10/443 429/120 |
| 5,955,177 | A * | 9/1999 | Sanocki | C03C 25/42 427/282 |
| 5,985,483 | A * | 11/1999 | Verhoog | H01M 2/1077 429/120 |
| 6,296,968 | B1 * | 10/2001 | Verhoog | B60L 11/1874 29/623.1 |
| 6,437,537 | B2 * | 8/2002 | Park | H01M 2/1077 320/107 |
| 6,569,556 | B2 * | 5/2003 | Zhou | H01M 2/1083 429/120 |
| 6,586,132 | B1 * | 7/2003 | Fukuda | H01M 2/1077 429/120 |
| 6,662,863 | B2 * | 12/2003 | Igami | F28F 9/0212 165/174 |
| 7,642,003 | B2 * | 1/2010 | Ahn et al. | 429/120 |
| 7,775,062 | B2 * | 8/2010 | Blomquist | 62/259.2 |
| 9,638,475 | B2 * | 5/2017 | Burgers | F28F 3/06 |
| 2002/0190097 | A1 * | 12/2002 | Pettersen | 228/103 |
| 2003/0217838 | A1 * | 11/2003 | Dey | F28D 1/0535 165/173 |
| 2006/0056937 | A1 * | 3/2006 | Babej et al. | 411/181 |
| 2006/0110657 | A1 * | 5/2006 | Stanton | H01M 2/1072 429/120 |
| 2008/0156455 | A1 * | 7/2008 | Powers et al. | 165/67 |
| 2009/0104511 | A1 * | 4/2009 | Maguire | B60L 11/1874 429/120 |
| 2009/0325055 | A1 * | 12/2009 | Koetting | H01M 10/6556 429/120 |
| 2010/0044007 | A1 * | 2/2010 | Sensui et al. | 165/67 |
| 2011/0100585 | A1 * | 5/2011 | Hohenstein | H01L 23/473 165/41 |
| 2011/0114287 | A1 * | 5/2011 | Arik | H05K 7/20172 165/67 |
| 2011/0269008 | A1 * | 11/2011 | Houchin-Miller | B60L 11/1874 429/120 |
| 2012/0003521 | A1 * | 1/2012 | Sohn | F28D 15/0266 429/120 |
| 2012/0009457 | A1 * | 1/2012 | Lee | B60L 11/1874 429/120 |
| 2012/0045681 | A1 * | 2/2012 | Klaus | H01M 10/0525 429/120 |
| 2012/0045682 | A1 | 2/2012 | Oury et al. | |
| 2012/0148911 | A1 * | 6/2012 | Suzuki | H01M 2/0426 429/179 |

FOREIGN PATENT DOCUMENTS

| | | | | |
|---|---|---|---|---|
| DE | 102008059952 | * | 10/2010 | H01M 10/50 |
| DE | 10 2011 109 485 | A1 | 2/2012 | |
| DE | 10 2011 005 236 | A1 | 9/2012 | |
| EP | 0250918 | * | 1/1988 | H01R 43/00 |
| FR | 2966580 A1 | * | 4/2012 | B60H 1/2221 |
| GB | 1 555 973 A | | 11/1979 | |
| JP | 2008159440 | * | 7/2008 | H01M 10/50 |

OTHER PUBLICATIONS

Machine Translation for EP0250918.*
Machine Translation FR 2966580 A1.*
Machine Translation DE 102008059952 A1.*
German Search Report, Application No. DE 10 2012 214 783.7, dated Apr. 24, 2013, 5 pgs.

* cited by examiner

HEAT EXCHANGER FOR A BATTERY UNIT

CROSS-REFERENCE TO RELATED PATENT APPLICATIONS

This application is based upon and claims the benefit of priority from prior German Patent Application No. 10 2012 214 783.7, filed Aug. 20, 2012, the entire contents of which are incorporated herein by reference in their entirety.

TECHNICAL FIELD

The invention relates to a heat exchanger for a battery unit as per the preamble of claim 1.

PRIOR ART

During the operation of a battery, heat losses are generated which cause the battery to heat up. Lithium-ion batteries in particular age considerably faster above a temperature which is dependent on the type of construction, such that the service life of the battery can be undesirably shortened. Battery coolers are used to counteract this effect. Such battery coolers have become known inter alia from the applicant's prior application DE 10 2011 005 236.4.

Battery cells are often cooled on the underside—with conductors and terminals accordingly being situated on the top—by means of an areal cooler or a cooling plate, wherein the areal cooler or the cooling plate will be referred to hereinafter as heat exchanger. Said heat exchanger comprises internally situated tubes in which a coolant is conducted. Constructions are known which are composed of tubes which are plugged in each case at both sides into in each case one collector. Furthermore, constructions exist which are constructed from layered metal sheets or embossed metal sheets. Most constructions have in common the fact that they are composed entirely of aluminum and are joined together to form a fluid-tight heat exchanger in a brazing process.

In the case of a battery, it is firstly necessary for the battery cells to be placed in direct, that is to say heat-conducting contact with the heat exchanger, and secondly, for safety reasons, electrical insulation must be provided between the battery cells and the heat exchanger. Furthermore, the heat exchanger has a facility for electrical potential equalization with a housing of the battery.

For electrical potential equalization, use is made of flexible copper lines which connect the heat exchanger to the housing of the battery. To avoid contact corrosion with the heat exchanger composed of aluminum, use is made of a copper-aluminum disk. Furthermore, a multiplicity of additional components in the form of serrated disks or washers, screws and nuts is required which must furthermore be mounted in the correct positions in order that the necessary heat-conducting contact and the electrical insulation between the heat exchanger and battery is ensured.

PRESENTATION OF THE INVENTION, PROBLEM, SOLUTION, ADVANTAGES

The problem addressed by the invention is that of providing a heat exchanger for a battery unit, which heat exchanger permits an inexpensive potential equalization, which exhibits low susceptibility to assembly faults, between the heat exchanger and the housing of the battery.

This is achieved by means of the features of claim 1, according to which the potential equalization element and the collector are formed in one piece. Owing to the use of the collector itself as a potential equalization element, it is possible to dispense entirely with an additional copper line. Therefore the multiplicity of additional components that are required in order to mount the flexible copper line in the correct position can also be dispensed with. This enables the heat exchanger to be mounted on the housing of the battery in a not only inexpensive but also fault-free manner. Owing to the fact that the potential equalization element is a constituent part of the collector itself, the transition resistance on the side from the collector to the potential equalization element is reduced in relation to the transition resistance from the collector to a copper cable with corresponding screw connection, or can be substantially eliminated. The assembly outlay for the production of the potential equalization is considerably reduced, whereby possible faults are also restricted. The electrical insulation between the heat exchanger and battery can thus be realized in a simple manner.

The potential equalization element of the collector is advantageously composed of a material which is free from copper. As a result of the omission of copper, production costs are further reduced.

In one refinement, the potential equalization element is in the form of a projection. Such a projection thus serves as a conductor for potential equalization and may be formed at different positions of the collector depending on the available installation space in the battery unit.

In one refinement, the potential equalization element of the collector is formed in the manner of a lug. The lug may be produced in elongate form in particular in order to be adapted to the structural conditions of the battery unit and of the heat exchanger. The line cross section required for the potential equalization may be realized by means of the width of the lug-like potential equalization element. The position and orientation of the lug-like potential equalization element can be produced with a high level of repeat accuracy by means of tools. To attain a desired level of flexibility for example for assembly, this may be attained by means of an adequate length and shaping of the lug-like projection, for example in the form of a compensation loop (U-shaped expansion loop).

In a further embodiment, the potential equalization element formed in the manner of a lug extends approximately parallel to the collector. This has the advantage that the least possible amount of installation space is required for the potential equalization element. Furthermore, correct positioning of the potential equalization element is ensured in a simple manner.

In one variant, for the connection of the lug-like potential equalization element to the housing of the battery, a cable shoe is applied to the lug-like end thereof. A cable shoe of said type ensures simplified electrical contacting with the lug-like potential equalization element, preferably by means of a screw-type or plug-in connection.

In one embodiment, the cable shoe is composed of aluminum, wherein an oxidation preventer is applied to the inner side and/or outer side thereof. The oxidation preventer prevents the growth of oxide layers on the contact surfaces of the lug-like potential equalization element which make contact with the housing of the battery. In this way, it is ensured that the electrical contact and thus the potential equalization between the heat exchanger and the housing of the battery are produced reliably.

In one refinement, the oxidation preventer on the inner side of the cable shoe is formed by contact grease, whereas the outer side of the cable shoe is tin-plated for oxidation prevention. Both the introduction of contact grease and also the tin-plating of the outer side of the cable shoe constitute routine methods for the prevention of oxide layers on contact surfaces, and can be realized in a simple manner. The production outlay and assembly time for the heat exchanger are thus reduced.

In a particularly simple embodiment, the potential equalization element is encompassed by and compressed with the cable shoe. A permanent electrical connection is thus ensured between the collector and the housing of the battery, wherein the compression is realized preferably by crimping or calking.

In one alternative, the potential equalization element is in the form of a press-in plug which fits into a press-in receptacle of the housing of the battery, or is designed as a press-in receptacle which receives a press-in plug of the housing of the battery. Through the use of such accurately fitting plug connections, it is possible to dispense with additional screw connections. In this way, it is ensured that, even during transportation of the heat exchanger, the screw connections cannot loosen, and thus the potential protection is reliably provided.

In one refinement, the press-in plug has at least one resilient element. Said resilient element has the effect that permanent contact between the plug and the press-in receptacle is ensured. The potential protection is reliably ensured in this way too.

Further advantageous refinements are described by the following description of the figures and by the subclaims.

BRIEF DESCRIPTION OF THE DRAWINGS

The invention will be explained in more detail below on the basis of at least one exemplary embodiment and with reference to the drawings, in which.

PREFERRED EMBODIMENT OF THE INVENTION

Figure 1:
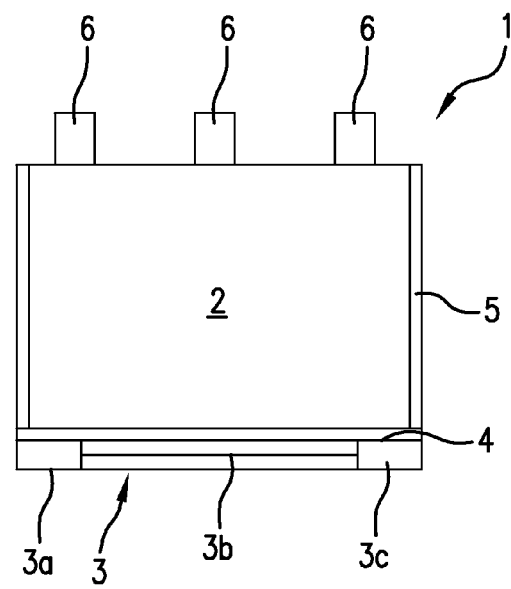
FIG. 1 shows an exemplary embodiment of a battery unit having a heat exchanger.

FIG. 1 shows an exemplary embodiment of a battery unit 1 in which a lithium-ion battery 2 is arranged on a heat exchanger 3 in the form of a cooling plate. An electrical insulation 4 is arranged between the lithium-ion battery 2 and the heat exchanger 3. Electrical terminals 6 of the lithium-ion battery 2 are arranged on that side of the lithium-ion battery 2 which faces away from the heat exchanger 3. The unit composed of lithium-ion battery 2 and heat exchanger 3 is positioned in a housing 5. The heat exchanger 3 is composed of two collectors 3a, 3c, between which coolant-conducting tubes 3b extend.

Figure 2:
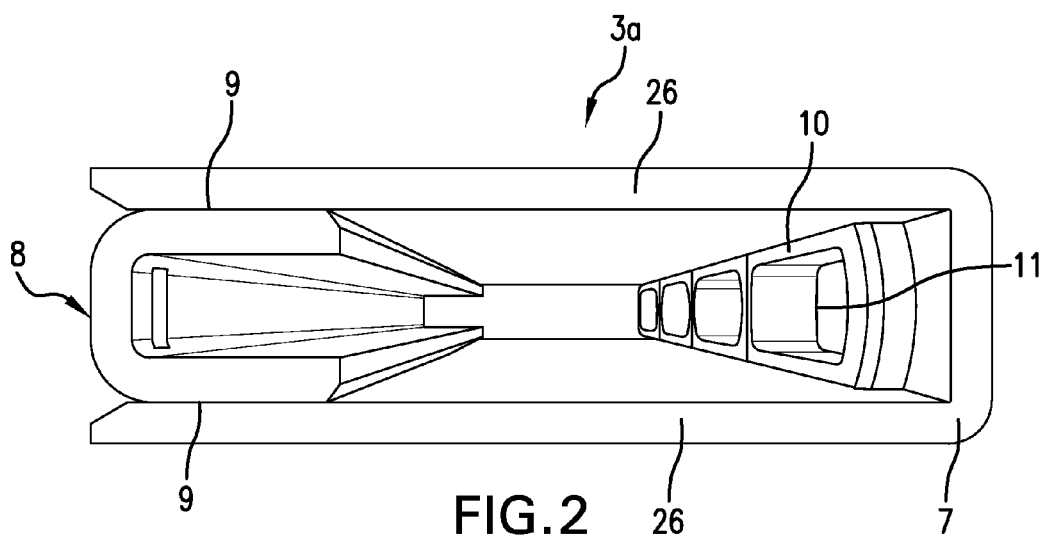
FIG. 2 is a perspective illustration of a collector with small structural height as per FIG. 1.

FIG. 2 is a perspective illustration of the collector 3a as per FIG. 1. The collector 3a is of two-part construction and is composed of a U-shaped base element 7 and of a relatively short U-shaped cover element 8, wherein the cover element flanks 9 are pushed between the base element flanks 26. The cover element 8 is connected to the base element 7 in a fluid-tight manner. Multiple passage openings 11 are formed in the narrow section, which connects the two base element flanks 26, of the base element 7. Each passage opening 11 serves to receive a coolant-conducting tube 3b. The passage openings 11 are delimited by a collar 10 which is formed from an edge region of the collector 3a which is turned over toward an inner wall of the collector 3a. The second collector 3c is of analogous form.

Figure 3:
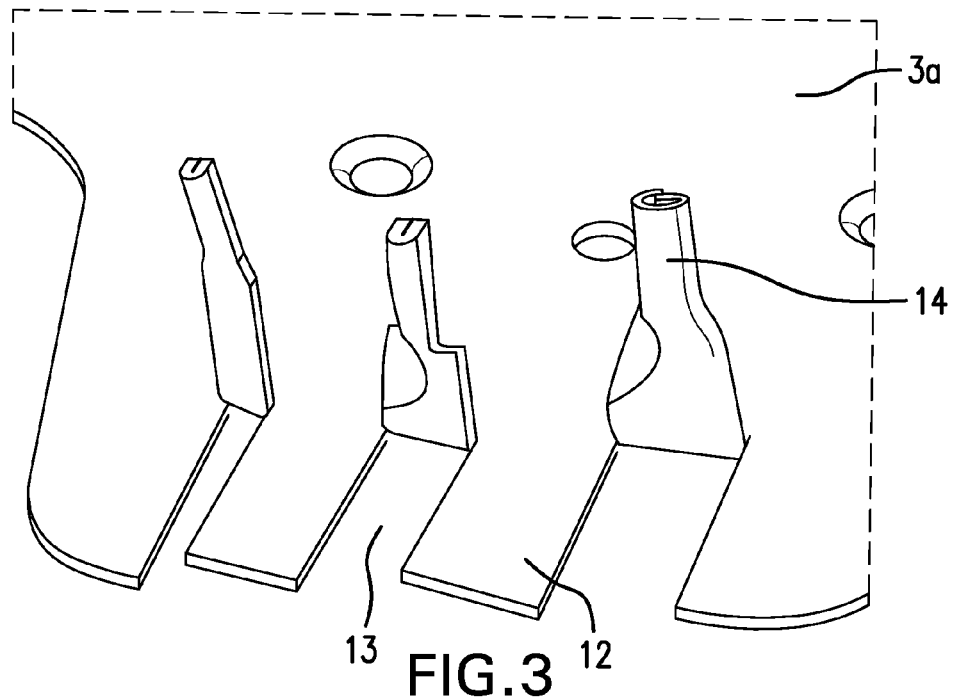
FIG. 3 shows a first exemplary embodiment of a potential equalization element.

FIG. 3 shows a first exemplary embodiment of a potential equalization element which is formed in one piece with the collector 3a. Said potential equalization element serves for grounding the lithium-ion battery 2 and connects the collector to the housing 5. The detail in FIG. 3 illustrates one end of the very flat collector 3a, said end having a comb-like region 12, wherein projections 14 are bent out of the recesses 13 of the comb-like region 12 so as to stand approximately perpendicular to the collector 3a. Said projections 14 serve as potential equalization elements and are connected to the housing 5. The very flat collector 3a is manufactured from aluminum, wherein the projections 14, which are an integral constituent part of the collector 3a, are likewise composed of aluminum. The use of aluminum for the production of the heat exchanger 3 not only reduces the material outlay but also permits simple production, because the collector 3a can be formed together with the projections 14 from one aluminum sheet in one method step by means of a simple punching and bending pressing process.

Figure 4:
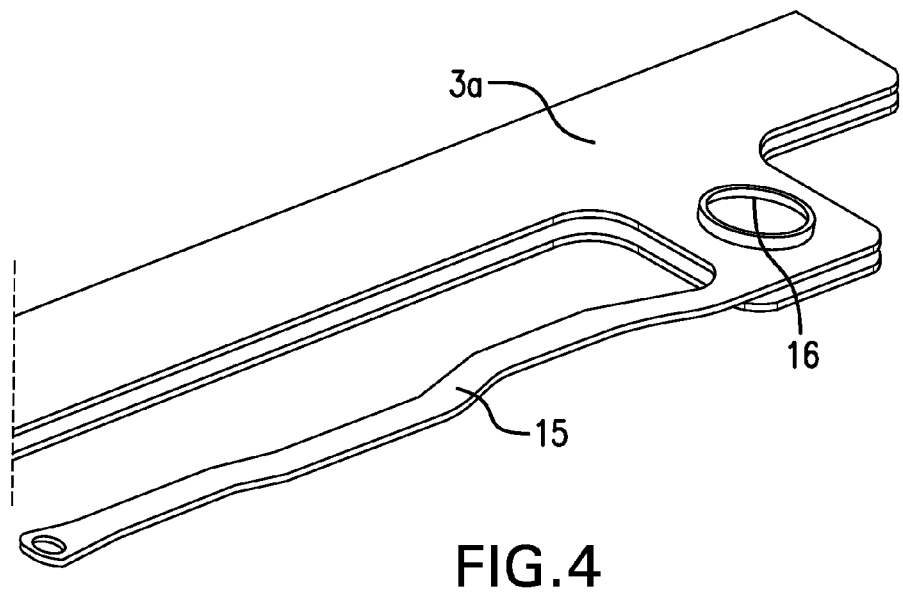
FIG. 4 shows a second exemplary embodiment of a potential equalization element.

FIG. 4 shows a second exemplary embodiment of the potential equalization element of the collector 3a, wherein the potential equalization element is in the form of an elongate lug 15. Said lug 15 extends parallel along the outer side of the collector 3a and, owing to its length, can be formed in any desired shape in order to be adapted to the structural conditions within the housing 5 and in order to be reliably electrically connected to the housing 5. The collector 3a, a detail of which is illustrated in FIG. 4, has a connector piece 16 to which there can be connected a tube 3b (not illustrated in any more detail) through which the coolant is distributed into the first collector 3a and from said first collector 3a into the tubes 3b. From the tubes 3b, the coolant is supplied to the second collector 3c which discharges the coolant to a coolant circuit.

Figure 5:
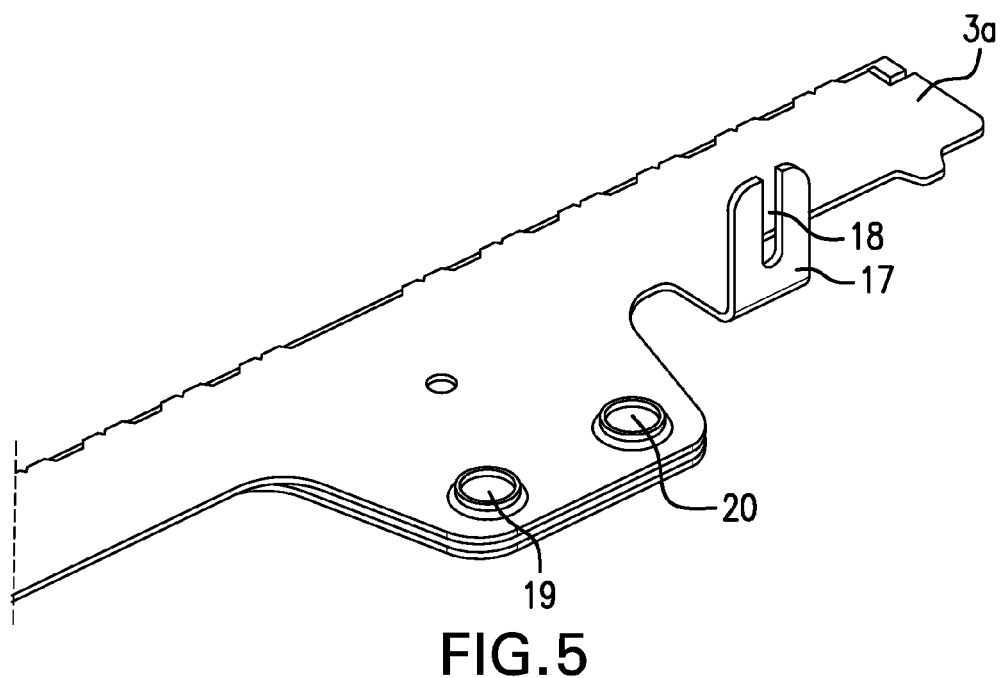
FIG. 5 shows a third exemplary embodiment of a potential equalization element.

A third possible embodiment of the potential equalization element is illustrated in FIG. 5, in which the lug-like projection 17 which serves as a potential equalization element is bent away perpendicularly from the collector 3a and has a slot 18 in which a counterpart of the housing 5 can be anchored.

Figure 6A:
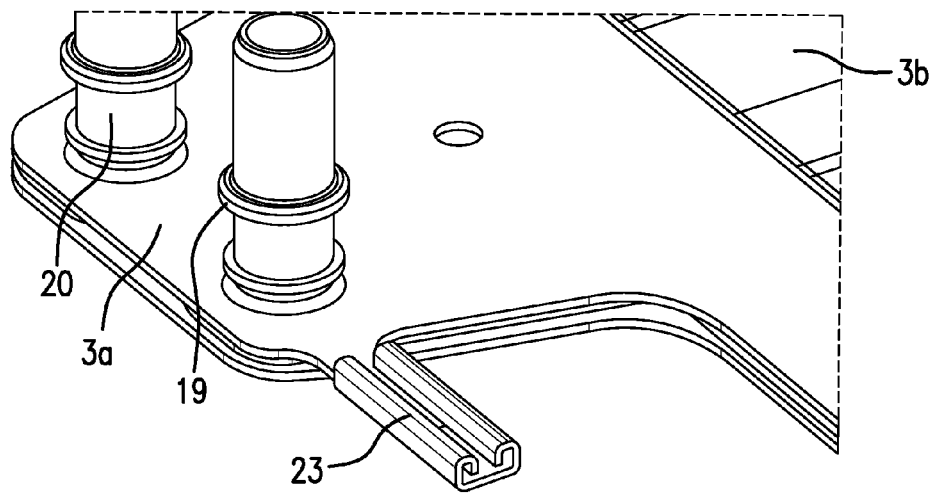
FIG. 6 shows a fourth exemplary embodiment of a potential equalization element.
Figure 6B:
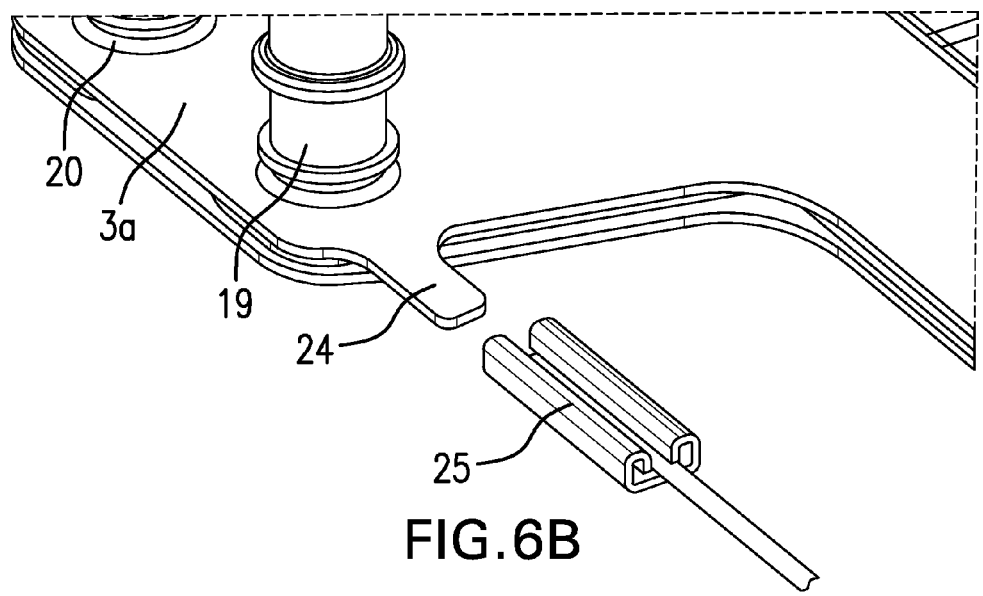

FIGS. 6a and 6b illustrate a fourth exemplary embodiment of the potential equalization element. On the collector 3a there are formed connector pieces 19, 20, which project perpendicularly therefrom, for in each case one coolant tube 3b into which the coolant is conducted below the lithium-ion battery 2. FIG. 6a shows the potential equalization element in the form of a plug connection 23 which is likewise an integral constituent part of the collector 3a and which extends in the plane of the collector 3a. A jack (not illustrated in any more detail) of the housing 5 is inserted into said plug connection 23 in order to produce electrical contact between the collector 3a and the housing 5.

An alternative is illustrated in FIG. 6b, where there is formed on the collector 3a a jack 24 which can be inserted into a housing plug 25 in order to produce the electrical connection.

Figure 7:
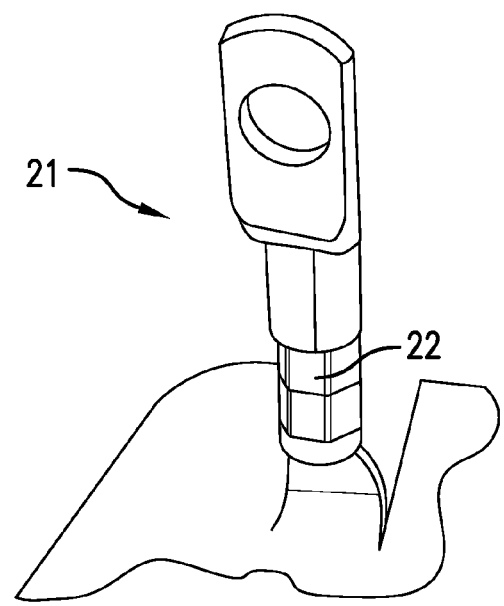
FIG. 7 shows an exemplary embodiment of a cable shoe.

In the case of a lug-like potential equalization element 14, 15, 17 being used, as is illustrated in FIGS. 3, 4 and 5, the potential equalization element is inserted into a cable shoe 21, as is illustrated by way of example in FIG. 7. The cable shoe 21 is in this case composed of aluminum and is tin-plated on the outer surface. On the inner side, contact grease is used for protection against oxidation. The end of the potential equalization element 14, 15, 17 is inserted into the inner side of the cable shoe 21 and crimped or calked to form a permanent fixed connection. Here, the cable shoe 21 has, in the portion 22, a cylindrical inner side into which the potential equalization element 14, 15, 17 is inserted. Alternatively, however, the cable shoe 21 may also be of cuboidal form on its inner side in a manner corresponding to the sheet-metal blank of the collector 3*a*, such that the potential equalization element 14, 15, 17 can be inserted with an accurate fit into the cable shoe 21.

The described potential equalization element which is formed integrally with the collector 3*a* thus replaces not only a flexible cable but also rigid connecting components which are protected against oxidation, such as pins, eyelets and the like, which are connected to the collector 3*a* by means of an additional assembly step such as ultrasound welding. As a result, the transition resistances from the collector 3*a* to the potential equalization element are reduced. Aside from the reduction in assembly outlay, corresponding possible faults are also reduced. The overall solution is thus very inexpensive.

The invention claimed is:

1. A heat exchanger for a battery unit, comprising:
a lithium-ion battery arranged on the heat exchanger,
wherein the lithium-ion battery comprises battery cells enclosed by a battery housing,
an electrical insulation arranged between the lithium-ion battery and the heat exchanger,
coolant-conducting tubes comprising ends that in each case connect to one collector,
wherein each collector is connected to at least one tube and a potential equalization element, wherein the potential equalization element electrically connects a body of at least one collector to the battery housing and equalizes the voltage potential of the at least one collector and the battery housing,
wherein the potential equalization element and the collector are formed in one piece.

2. The heat exchanger according to claim 1, wherein the potential equalization element of the collector is composed of a material which is free from copper.

3. The heat exchanger according to claim 1, wherein the potential equalization element is in the form of a projection.

4. The heat exchanger according to claim 1, wherein the potential equalization element is formed in the manner of a lug.

5. The heat exchanger according to claim 4, wherein the potential equalization element formed in the manner of a lug extends approximately parallel to the collector.

6. The heat exchanger according to claim 3, wherein for the connection of the lug-like potential equalization element to the housing of the battery, a cable shoe is applied to the lug-like end thereof.

7. The heat exchanger according to claim 6, wherein the cable shoe is composed of aluminum, wherein an oxidation preventer is applied to the inner side and/or outer side thereof.

8. The heat exchanger according to claim 7, wherein the oxidation preventer on the inner side of the cable shoe is formed by a contact grease, whereas the outer side of the cable shoe is tin-plated for oxidation prevention.

9. The heat exchanger according to claim 7, wherein the potential equalization element is encompassed by and compressed with the cable shoe.

10. The heat exchanger according to claim 1, wherein the potential equalization element is in the form of a press-in plug which fits into a press-in receptacle of the housing of the battery, or is designed as a press-in receptacle which receives a press-in plug of the housing.

11. A heat exchanger for a battery unit, comprising:
a lithium-ion battery arranged on the heat exchanger,
wherein the lithium-ion battery comprises battery cells arranged in a space bounded by a battery housing,
an electrical insulation arranged between the lithium-ion battery and the heat exchanger,
coolant-conducting tubes comprising ends that in each case connect to one collector,
wherein each collector is of two-part construction and is composed of a U-shaped base element and of a relatively short U-shaped cover element, wherein each collector is connected to at least one tube and a potential equalization element, wherein the collector comprises passages for receiving the at least one tube, wherein the passages are each delimited by a collar which is formed from an edge of the collector which is turned toward the inner wall of the collector, wherein the potential equalization element electrically connects a body of at least one collector to the battery housing and equalizes the voltage potential of the at least one collector and the battery housing, wherein the potential equalization element and one part of the two-part collector are formed in one piece.

12. The heat exchanger according to claim 1, wherein the potential equalization element grounds the lithium-ion battery to the heat exchanger.

13. The heat exchanger according to claim 11, wherein the potential equalization element grounds the lithium-ion battery to the heat exchanger.

14. The heat exchanger according to claim 1, wherein the potential equalization element prevents electric faults between the heat exchanger and the lithium-ion battery.

15. The heat exchanger according to claim 11, wherein the potential equalization element prevents electric faults between the heat exchanger and the lithium-ion battery.

* * * * *